US009066618B2

(12) United States Patent
Lim et al.

(10) Patent No.: US 9,066,618 B2
(45) Date of Patent: Jun. 30, 2015

(54) APPARATUS FOR EXTRACTING JUICE

(75) Inventors: Tae Gyu Lim, Gyeonggi-do (KR); Chul Gu Lee, Gyeonggi-do (KR); Kyoung Ho Lee, Gyeonggi-do (KR); Dong Hoon Kang, Gyeonggi-do (KR)

(73) Assignee: TONGYANG MAGIC Inc., Seoul (KR)

( * ) Notice: Subject to any disclaimer, the term of this patent is extended or adjusted under 35 U.S.C. 154(b) by 687 days.

(21) Appl. No.: 13/412,336

(22) Filed: Mar. 5, 2012

(65) Prior Publication Data

US 2012/0227592 A1 Sep. 13, 2012

(30) Foreign Application Priority Data

Mar. 7, 2011 (KR) .......................... 10-2011-0019958
Jul. 19, 2011 (KR) .......................... 10-2011-0071359

(51) Int. Cl.
*H05B 3/02* (2006.01)
*A47J 19/02* (2006.01)

(52) U.S. Cl.
CPC ................ *A47J 19/02* (2013.01); *A47J 19/025* (2013.01)

(58) Field of Classification Search
CPC ........... A23N 1/00; A23N 1/003; A23N 1/02; A47J 19/00; A47J 19/02; A47J 19/027
USPC ................... 99/201–503, 509–513; 100/117; 210/360.1, 369, 370, 407; 366/279, 366/309
See application file for complete search history.

(56) References Cited

U.S. PATENT DOCUMENTS

| 6,363,837 | B1 * | 4/2002 | Sham et al. .................... 99/348 |
| 8,091,473 | B2 | 1/2012 | Kim |
| 2006/0112838 | A1 * | 6/2006 | Herbst ........................... 99/422 |
| 2009/0049998 | A1 * | 2/2009 | Kim ............................... 99/510 |

FOREIGN PATENT DOCUMENTS

| CN | 1353582 | 6/2002 |
| CN | 101972104 | 2/2011 |
| KR | 1998-046647 | 9/1998 |
| KR | 2002-0043731 | 6/2002 |
| KR | 10-0639924 | 10/2006 |
| KR | 10-0755440 | 8/2007 |
| WO | WO-00-74502 A1 | 12/2000 |
| WO | WO-2007-148872 A1 | 12/2007 |
| WO | WO-2010-063956 A1 | 6/2010 |

* cited by examiner

*Primary Examiner* — Dana Ross
*Assistant Examiner* — Brandon Harvey

(57) ABSTRACT

A juice extracting apparatus of the present invention includes an extracting case having a juice outlet and a sludge outlet communicating an internal space thereof with an outside, an extracting screw unit positioned in the internal space of the extracting case, the extracting screw unit having a screw shaft connected to a drive shaft of a driving unit, a screw blade formed on an outer peripheral surface of the screw shaft and a sun gear mounted at the lower end of the screw shaft, a rotary extracting net unit in which the extracting screw unit is positioned, the rotary extracting net unit having a mesh net and a ring gear provided at its lower portion, and a discharge guide unit positioned at the lower portion of the rotary extracting net unit for guiding the sludge resulting from the extracting.

18 Claims, 12 Drawing Sheets

< Prior Art >

< Prior Art >

APPARATUS FOR EXTRACTING JUICE

CROSS-REFERENCE TO RELATED APPLICATION

This application claims priority of Korean Patent Application No. 10-2011-0019958, filed on Mar. 7, 2011 and priority of Korean Patent Application No. 10-2011-0071359, filed on Jul. 19, 2011, in the KIPO (Korean Intellectual Property Office), the disclosure of which is incorporated herein entirely by reference.

BACKGROUND OF THE INVENTION

1. Field of the Invention

The present invention relates to an apparatus for extracting juice type food by squeezing fruits, vegetables or beans.

2. Description of the Related Art

A juice extracting apparatus is an apparatus for extracting juice by squeezing agricultural and marine products such as fruits, vegetables or beans.

The configuration and functions of a conventional juice extracting apparatus are as follows.

FIG. 1 is a schematic drawing showing a conventional horizontal type juice extracting apparatus.

As shown in FIG. 1, in the horizontal type juice extracting apparatus, when a material such as a fruit or a vegetable (to be referred to as a "raw material" hereinafter) is injected into an upper inlet 10, the injected raw material is sliced while a screw 11 rotates as a motor 16 is driven.

Thereafter, the sliced raw material is conveyed toward a squeezing nozzle 13 to then be squeezed between the screw 11 and an extracting net unit 12, and juice extracted from the raw material is discharged to the outside through a juice outlet 15. In addition, sludge of the discharged raw material is discharged to the outside through the squeezing nozzle 13 and a nozzle cap 14.

In addition, when a highly sticky raw material is injected, it may stick on the extracting net unit 12, so that the amount of juice extracted is markedly reduced compared to the amount of the raw material.

FIG. 2 is schematic view showing another example of a conventional juice extracting apparatus, illustrating a vertical type juice extracting apparatus.

As shown in FIG. 2, in the vertical type juice extracting apparatus, a raw material such as a fruit or a vegetable is injected into an upper inlet 20, and a driving means 27 is driven to rotate a pulverizing gear 23 coupled to the driving means 27, a convey screw 22 and a shredder plate 21. Accordingly, the injected raw material is primarily sliced in the shredder plate 21 and then conveyed toward the pulverizing gear 23 through the convey screw 22.

The juice extracted from the sliced raw material in the course of conveying is discharged to a juice guide orifice 26 via the extracting net unit 24, and sludge of the raw material existing between the pulverizing gear 23 and the extracting net unit 24, from which juice has been extracted, is discharged to the outside through the sludge guide orifice 25.

The horizontal type juice extracting apparatus and the vertical type juice extracting apparatus are configured such that a screw or a pulverizing gear is solely rotated for extracting juice. Thus, in order to improve juice extracting efficiency, it is necessary to increase a number of revolutions of a motor. In this case, load may be applied to a driving means, thereby shortening a cycle life, increasing the amount of heat generated and increasing power consumption.

In addition, if a rotational speed of the driving means increases to exceed a predetermined range, nutrients of juice may be destructed, so that there is a limit in increasing the number of revolutions. That is to say, from the nutritional viewpoint, the juice extracting apparatus is preferably driven at a low speed, rather than at a high speed.

In the horizontal or vertical type juice extracting apparatus having an extracting net unit fixedly installed, when protrusions or grooves are soiled with sludge, it is quite difficult to perfectly wash the juice extracting apparatus.

SUMMARY OF THE INVENTION

Aspects of the present invention provide a juice extracting apparatus, which can improve juice extracting efficiency without increasing a number of revolutions of a driving means.

Aspects of the present invention also provide a juice extracting apparatus, which can easily clean components including an extracting net unit, while minimizing sludge stuck in or sticking on a component.

In accordance with one aspect of the present invention, there is provided a juice extracting apparatus including an extracting case having a juice outlet and a sludge outlet communicating an internal space thereof with an outside, an extracting screw unit positioned in the internal space of the extracting case, having a screw blade formed on its outer peripheral surface, a screw shaft connected to a drive shaft of a driving means at a lower end and a sun gear mounted at the lower end of the screw shaft, a rotary extracting net unit in which the extracting screw unit is positioned, the rotary extracting net unit comprising a mesh net corresponding to the screw blade to filter sludge while allowing juice to pass therethrough, and a ring gear provided at its lower portion, and a discharge guide unit positioned at the lower portion of the rotary extracting net unit, having planet gears engaged between the sun gear and the ring gear and transmitting a rotational force of the extracting screw unit to the rotary extracting net unit, and guiding the sludge resulting from the extracting, wherein the juice squeezed from a raw material injected while the extracting screw unit and the rotary extracting net unit rotate in opposite directions from each other is discharged through an outlet of the extracting case and the sludge is discharged to the outside through a sludge outlet.

The screw blade may have screw threads having a pitch interval gradually narrowing toward its bottom end from its top end.

The rotary extracting net may have at least one or more guide protrusions downwardly extending on its inner surface to convey the injected raw material downwardly in a geared manner with the screw threads of the screw blade.

The extracting case may further include a brush for removing sludge in contact with and sticking on the outer peripheral surface of the rotary extracting net fixed on its inner surface and rotating.

The rotary extracting net unit may further include a brush mounted on its outer peripheral surface and making a contact with the inner surface of the extracting case.

The rotary extracting net unit may further include at least one rotary protrusion formed on the outer peripheral surface of its bottom end, the at least one rotary protrusion forcibly conveying the juice existing on the bottom of the rotary extracting net unit to the juice outlet.

The rotary extracting net unit may further include a cleaner mounted on its outer peripheral surface and capable of rotating together with the rotary extracting net unit. Preferably, the cleaner has a rubber fixed on its inner surface and inwardly extending to correspond to the mesh net of the rotary extracting net unit.

The cleaner may have interior grooves radially formed on its inner peripheral surface and the rotary extracting net unit may have exterior protrusions radially formed on its outer peripheral surface, so that the exterior protrusions of the rotary extracting net unit are accommodated in the interior grooves of the cleaner, thereby guiding rotation of the cleaner.

The cleaner may further include a stopper protrusion fixed on its outer peripheral surface and the extracting case may further include a hooking portion formed on its outer peripheral surface and outwardly protruding, so that the cleaner does not rotate and only the rotary extracting net unit rotates when the stopper protrusion and the hooking portion make a contact with each other, and the rubber of the cleaner removes the sludge sticking on the mesh net of the rotary extracting net unit is removed.

The juice extracting apparatus may further include a cleaner fixed on the extracting case and made of an elastic material, wherein the cleaner make a contact with the rotating extracting net unit and forcibly removes the sludge sticking on the mesh net of the rotary extracting net unit.

The cleaner may include a fitting portion fitted into the hooking portion formed in the extracting case and an extending portion extending from the fitting portion to the rotary extracting net unit and making a contact with the net unit of the rotating rotary extracting net unit.

The discharge guide unit may further include a guide rubber fixedly installed at a bottom end of the outlet and capable of elastically opening or closing the outlet at its one side.

The juice extracting apparatus may further include an injection cover coupled to the extracting case and including an inlet for injecting the raw material, an injection pipe integrally formed with the inlet so that the injected raw material is vertically conveyed, and a plurality of engagement protrusions radially formed at a bottom portion of the injection cover to be engaged with the extracting case.

The juice extracting apparatus may further include a sensor sensing a current varying according to the load applied to the drive shaft of the driving means, and a controller connecting the sensor and the driving means, wherein when overload is applied to the drive shaft, the controller controls the driving means capable of rotating forward and backward to rotate backward for a predetermined time to then rotate forward.

As described above, in the juice extracting apparatus according to the present invention, an extracting screw unit rotates in a first direction and a rotary extracting net unit rotates in a second direction opposite to the first direction in which the extracting screw unit rotates, thereby improving juice extracting efficiency even with a small driving force (a rotational force).

In addition, since the extracting screw unit and the rotary extracting net unit rotate in opposite directions, sludge existing between the extracting screw unit and the rotary extracting net unit can be minimized and effectively cleaning the outer peripheral surface of the rotary extracting net unit.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter a juice extracting apparatus according to a first embodiment of the present invention will be described.

Figure 1:
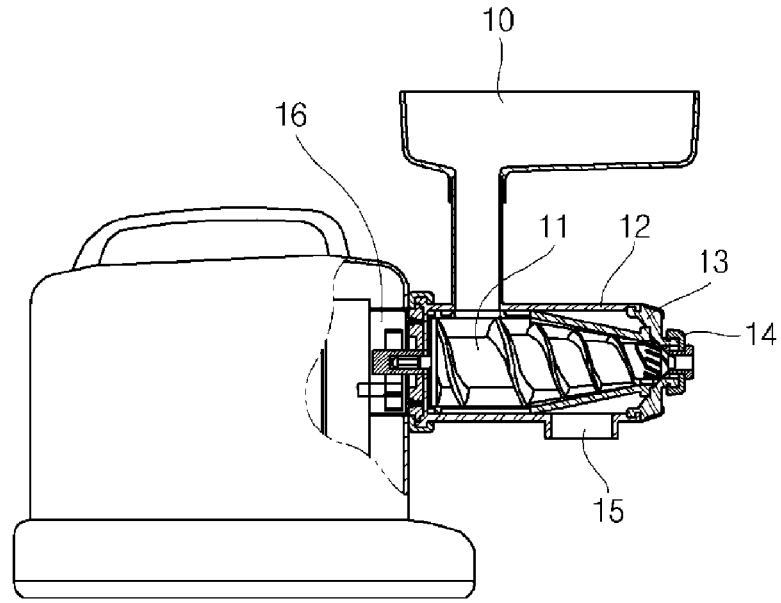
FIG. 1 is a schematic diagram of a general horizontal type juice extracting apparatus.
Figure 2:
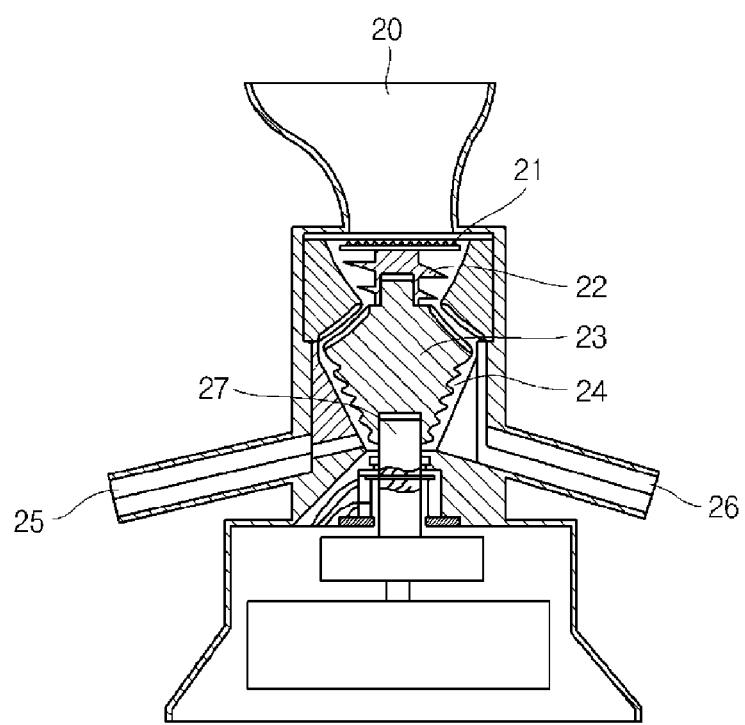
FIG. 2 is schematic diagram of another example of a general juice extracting apparatus, illustrating a vertical type juice extracting apparatus.
Figure 3:
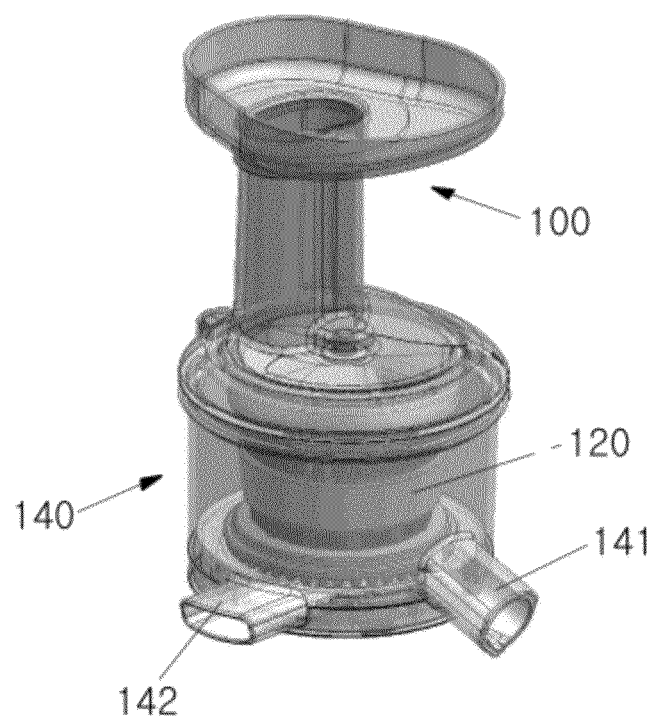
FIG. 3 is a perspective view of a juice extracting apparatus according to a first embodiment of the present invention.
Figure 4:
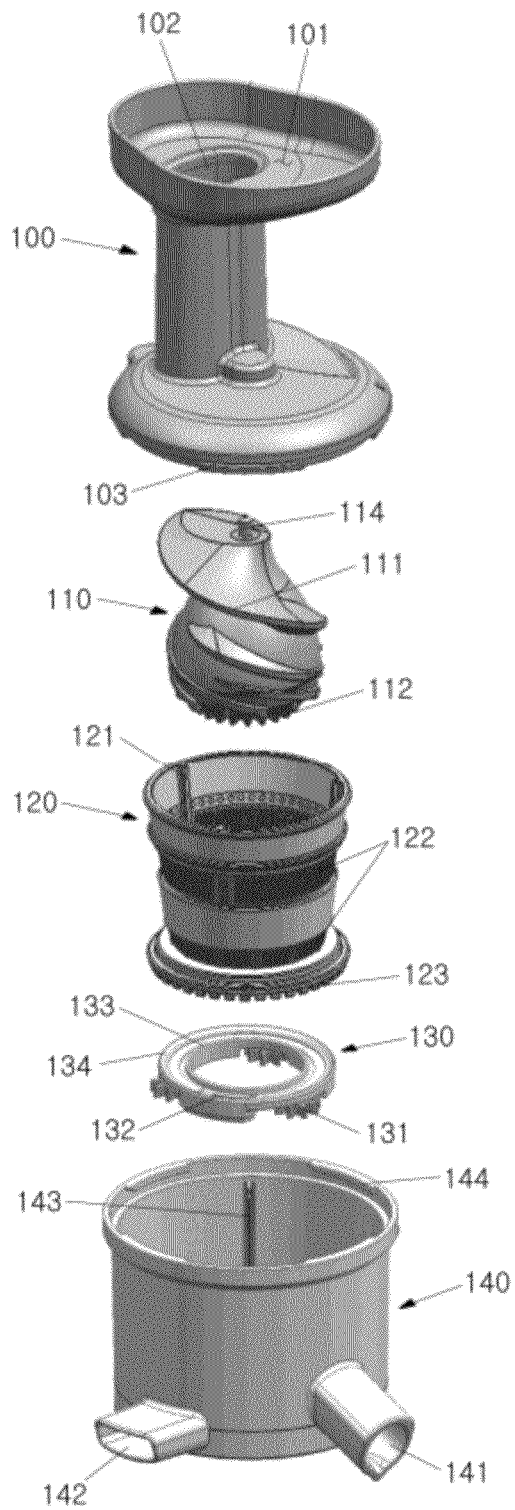
FIG. 4 is an exploded perspective view of the juice extracting apparatus shown in FIG. 3.
Figure 5:
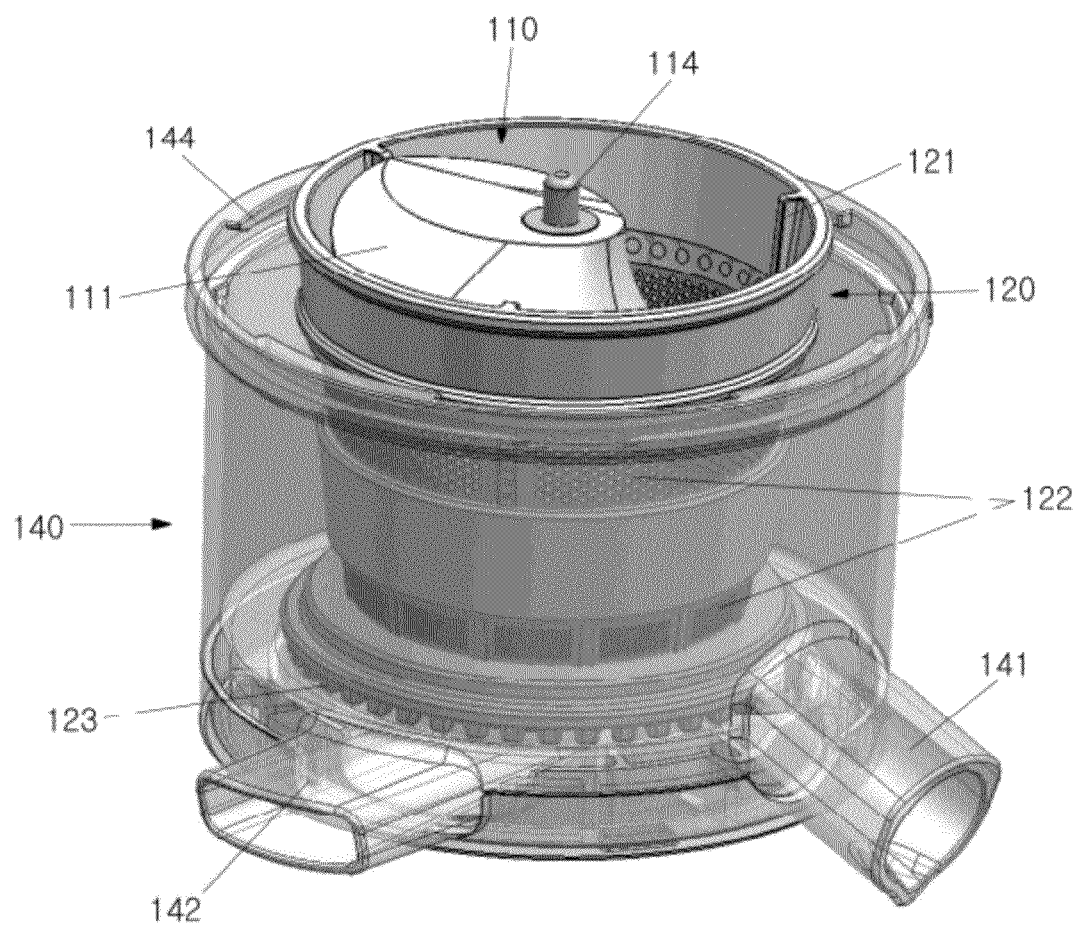
FIG. 5 illustrates a state in which an injection cover is removed from the juice extracting apparatus shown in FIG. 3.

As shown in FIGS. 3 to 5, the juice extracting apparatus according to the first embodiment of the present invention includes an injection cover 100, an extracting screw unit 110, a rotary extracting net unit 120, a discharge guide unit 130 and an extracting case 140.

First, the injection cover 100 includes a hopper-shaped inlet 101 formed at its top portion to inject a material for extracting juice, such as fruits or vegetables (hereinafter, referred to as "raw material"); an injection pipe 102 integrally formed with the inlet 101 at a lower portion of the inlet 101 so that the injected raw material is vertically conveyed, and a plurality of engagement protrusions 103 radially formed at a bottom portion of the injection cover 100 to be engaged with the extracting case 140.

The extracting screw unit 110 includes a screw shaft 113 (shown in FIG. 6) having an insertion protrusion 114 formed at its top end and an insertion groove 115 (shown in FIGS. 6 and 7) formed at its bottom end; a screw blade 111 having a pitch and screw threads gradually decreasing toward its bottom end from its top end with respect to the screw shaft 113; and a sun gear 112 fixed at a bottom of the screw shaft 113.

An insertion groove 116 (shown in FIGS. 6 and 7) is formed at the center of the bottom of the screw 110 to be placed on the extracting case 140. The screw shaft 113 is connected to a drive shaft (not shown) of a driving means (not shown) positioned outside the extracting case 140.

The rotary extracting net unit 120 is a cylindrical structure and the extracting screw unit 110 is disposed inside the rotary extracting net unit 120. The rotary extracting net unit 120 includes one or more guide protrusions 121 downwardly extending on the inner surface of the rotary extracting net unit 120 to convey the injected raw material downwardly in a geared manner with the screw blade 111; a mesh net 122 formed at top and bottom portions of its outer peripheral surface to filter sludge of the raw material while allowing juice to pass therethrough; and a ring gear 123 fixed at its bottom end.

The discharge guide unit 130 includes a sludge outlet 132 positioned at a lower portion of the rotary extracting net unit 120 and allowing the sludge of the compressed and juice-extracted raw material to be discharged; an interior protrusion 133 and an exterior protrusion 134 maintaining pressures at bottom ends of the extracting screw unit 110 and the rotary extracting net unit 120; planet gears 131 engaged between the sun gear 112 of the extracting screw unit 110 and the ring gear 123 of the rotary extracting net unit 120 and transmitting a rotational force of the extracting screw unit 110 to the rotary extracting net unit 120; and a fixing shaft 135 (shown in FIG. 7) for fixing each of the planet gears 131.

Figure 8:
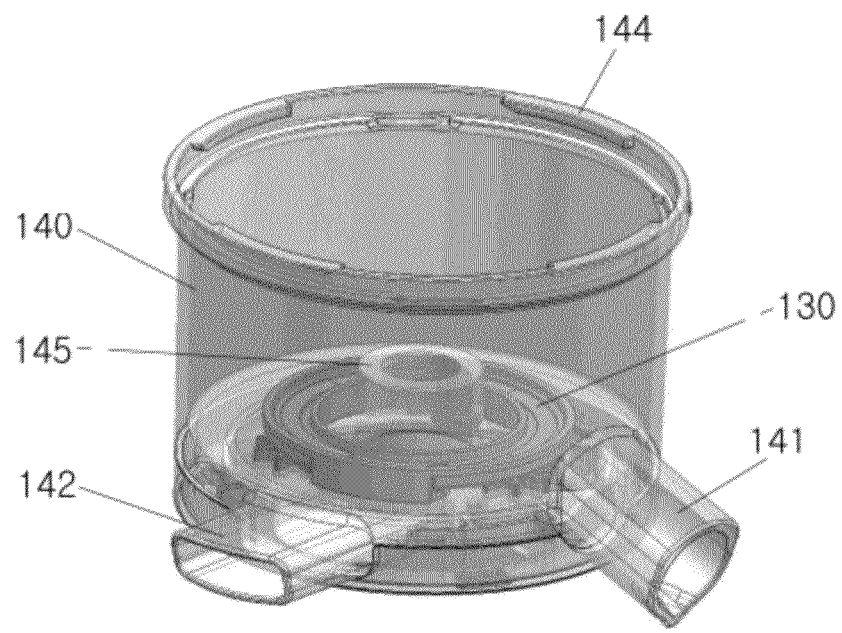
FIG. 8 illustrates a state in which a discharge guide unit and an extracting case shown in FIG. 4 are assembled to each other.

As shown in FIG. 8, the extracting case 140 has top engagement units 144 coupled to the engagement protrusions 103 of the injection cover 100. A juice outlet 141 and a sludge outlet 142 communicating an internal space of the extracting case 140 with an outside are formed at opposite sides of the extracting case 140.

Figure 6:
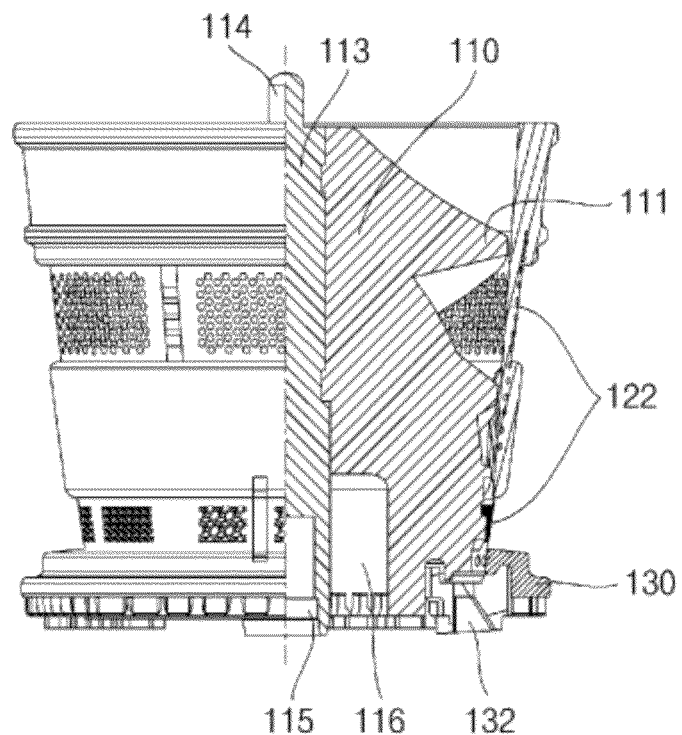
FIG. 6 is a partially sectional view of FIG. 5.

In particular, as shown in FIGS. 6 and 8, an interior bottom portion of the extracting case 140 is flatly configured to accommodate the extracting screw unit 110, the rotary extracting net unit 120 and the discharge guide unit 130. In addition, a cylindrical bushing 145, to which the extracting screw unit 110, specifically a sun gear 112 and a drive shaft of a driving means (not shown) are engaged, is formed at the center of the extracting case 140.

Meanwhile, the extracting case 140 may further include a brush 143 fixed at one side of its inner surface and extending upwardly.

Hereinafter, the operation of the juice extracting apparatus according to the first embodiment of the present invention will be described with reference to the following drawings.

Figure 9:
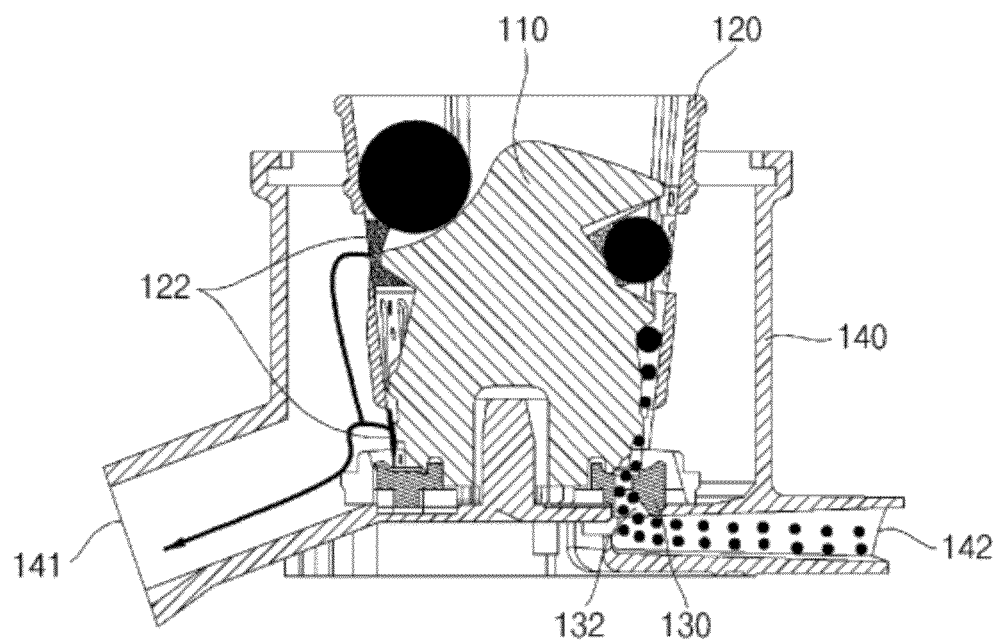
FIG. 9 illustrates an operating state of the juice extracting apparatus shown in FIG. 3.

As shown in FIG. 9, if a raw material such as a fruit, vegetable or beans is injected into the inlet 101 of the injection cover 100, the extracting screw unit 110 engaged with the drive shaft (not shown) of the driving means (not shown but installed below the extracting case 140) rotates, thereby slicing the raw material by the screw blade 111.

Figure 7:
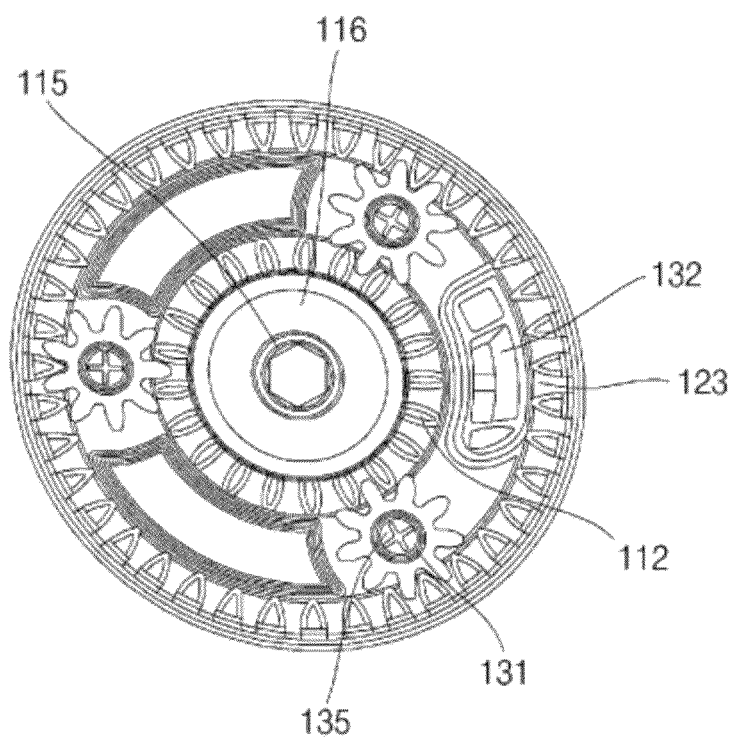
FIG. 7 is a bottom view of FIG. 6.

Meanwhile, as shown in FIG. 7, the sun gear 112 of the extracting screw unit 110, the plurality of planet gears 131 of the discharge guide unit 130, and the ring gear 123 of the rotary extracting net unit 120 are engaged with each other, thereby allowing the rotary extracting net unit 120 to rotate in an opposite direction to a direction in which the extracting screw unit 110 rotates according to the rotation of the extracting screw unit 110.

Here, a distance between the outer peripheral surface of the extracting screw unit 110 and the inner peripheral surface of the rotary extracting net unit 120 gradually decreases toward a lower end of the extracting screw unit 110, and the conveyed raw material is compressed therebetween. As described above, the raw material is downwardly conveyed by the guide protrusions 121 of the rotary extracting net unit 120 rotating in the opposite direction to the rotating direction of the extracting screw unit 110, thereby compressing and pulverizing the raw material.

The juice extracted from the raw material with a high pressure moves to a space between the rotary extracting net unit 120 and the extracting case 140 through the mesh net 122 of the rotary extracting net unit 120, to then be discharged to the outside through the juice outlet 141 of the extracting case 140, as indicated by an arrow in FIG. 9.

Meanwhile, the downwardly conveyed sludge is subjected to the maximum pressure at the discharge guide unit 130 to have the minimized volume thereat to then be discharged to the outside through the outlet 132 of the discharge guide unit 130 and the sludge outlet 142 of the extracting case 140.

As described above, the raw material is compressed and the juice is extracted from the compressed raw material while the extracting screw unit 110 and the rotary extracting net unit 120 rotate in opposite directions. Accordingly, the amount of sludge existing between the extracting screw unit 110 and the rotary extracting net unit 120 rotating in opposite directions can be minimized.

Here, the sludge sticking on the outer surface of the rotary extracting net unit 120 is separated and removed from the outer surface of the rotary extracting net unit 120 by the brush 143 formed at one side of the inner surface of the extracting case 140. Therefore, the sludge sticking on the mesh net 122 can be cleanly removed.

Hereinafter, a juice extracting apparatus according to a second embodiment of the present invention will be described with reference to the drawings. For brevity, in the following embodiment, components having substantially the same function as the first embodiment are identified by the same reference numerals, and detailed descriptions thereof will be omitted.

Figure 10:
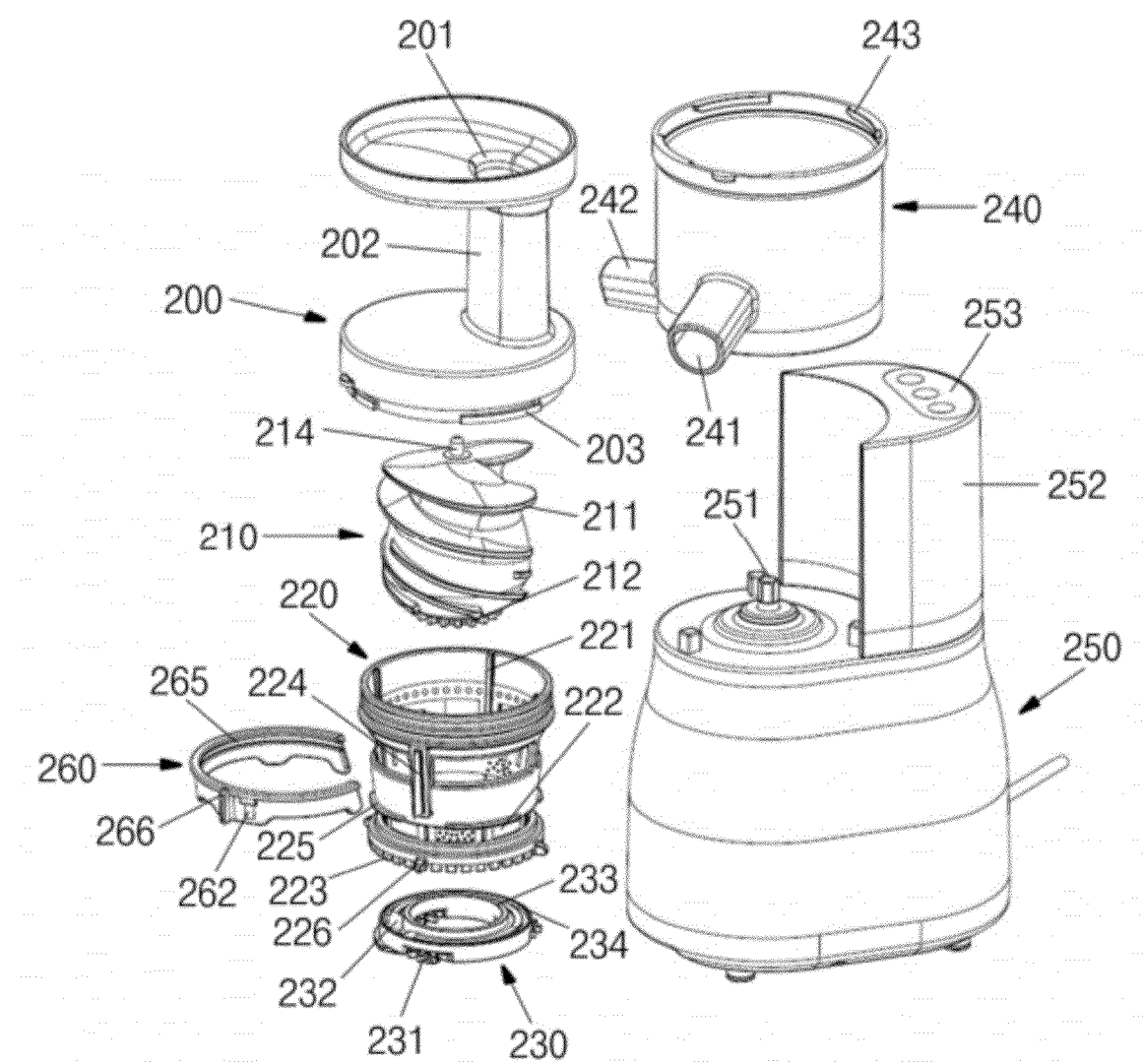
FIG. 10 is an exploded perspective view of a juice extracting apparatus according to a second embodiment of the present invention

As shown in FIG. 10, like the juice extracting apparatus according to the first embodiment of the present invention, the juice extracting apparatus according to the second embodiment of the present invention includes an injection cover 200, an extracting screw unit 210, a rotary extracting net unit 220, a discharge guide unit 230 and an extracting case 240. However, unlike the juice extracting apparatus according to the first embodiment of the present invention, the juice extracting apparatus according to the second embodiment of the present invention further includes a cleaner 260 mounted on the outer peripheral surface of the rotary extracting net unit 220.

Meanwhile, FIG. 10 illustrates a housing 250 in which a driving means (not shown) for rotating the extracting screw unit 210 is received and to which the above structural members are mounted. It is understood that a driving means housing having the same configuration and functions as those of the driving means housing 250 is also provided in the juice extracting apparatus according to the first embodiment of the present invention.

The overall configurations of the injection cover 200, the extracting screw unit 210 and the rotary extracting net unit 220 are substantially the same as the injection cover 100, the extracting screw unit 110 and the rotary extracting net unit 120 of the juice extracting apparatus according to the first embodiment of the present invention. Here, the rotary extracting net unit 220 may further includes a brush 204 mounted on its outer peripheral surface.

Meanwhile, the cleaner 260, which is mounted on the outer peripheral surface of the rotary extracting net unit 220 in an interference fit manner, has a C-letter shape with a portion cut and may rotate together with the rotary extracting net unit 220.

At least one rotary protrusion 226 may be formed on the outer peripheral surface of a bottom end of the rotary extracting net unit 220. The at least one rotary protrusion 226 forcibly conveys the juice existing on the bottom of the rotary extracting net unit 220 to the juice outlet 241 while rotating with the rotary extracting net unit 220.

Figure 11:
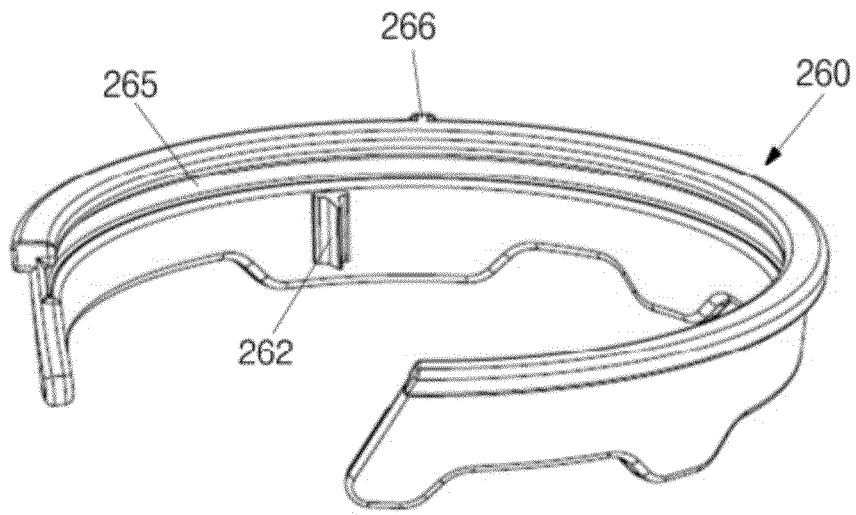
FIG. 11 illustrates a cleaner shown in FIG. 10

As shown in FIG. 11, the cleaner 260 has interior grooves 265 coupled to exterior protrusions 225 of the rotary extracting net unit 220. In addition, the cleaner 260 includes a stopper protrusion 266 corresponding to a hooking portion 246 (shown in FIG. 13) of the extracting case 240 for stopping rotation of the rotary extracting net unit 220 when the rotary extracting net unit 220 rotates, and a cleaner rubber 262 elastically installed within the rotary extracting net unit 220 to wipe up a mesh net 222 positioned at a lower portion of the rotary extracting net unit 220.

Here, the stopper protrusion 266 is assembled with the rotary extracting net unit 220 to then be placed on a bottom surface inside the extracting case 240, irrespective of its position, and selectively makes a contact with the hooking portion 246 of the extracting case 240, thereby restricting rotation of the rotary extracting net unit 200.

Figure 12:
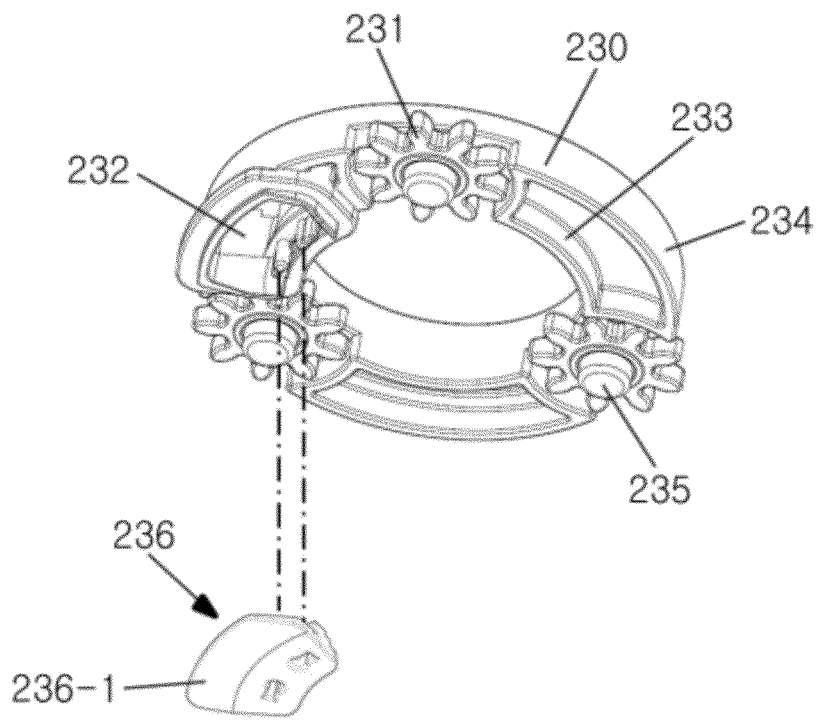
FIG. 12 is a bottom perspective view of a discharge guide shown in FIG. 10.

As shown in FIG. 12, the discharge guide unit 230 includes an outlet 232 through which sludge of a compressed and juice-extracted raw material is discharged; an interior protrusion 233 and an exterior protrusion 234 maintaining pressures at bottom ends of the extracting screw unit 210 and the rotary extracting net unit 220; planet gears 231 engaged between a sun gear 212 of the extracting screw unit 210 and a ring gear 223 of the rotary extracting net unit 220 and transmitting a rotational force of the extracting screw unit 210 to the rotary extracting net unit 220; and a fixing shaft 235 for fixing each of the planet gears 231.

In the juice extracting apparatus according to the embodiment of the present invention, the discharge guide unit 230 further includes a guide rubber 236 fixed at a bottom end of the outlet 232. The guide rubber 236 elastically opens or closes the outlet 232 at its one side 256-1.

Meanwhile, the planet gears 231 may be integrally fixed in the discharge guide unit 230 or may be detachably installed in the discharge guide unit 230.

The extracting case 240 has top engagement units 243 coupled to the engagement protrusions 203 of the injection cover 200. A juice outlet 241 and a sludge outlet 242 communicating an internal space of the extracting case 240 with an outside are formed at opposite sides of the extracting case 240.

Figure 13:
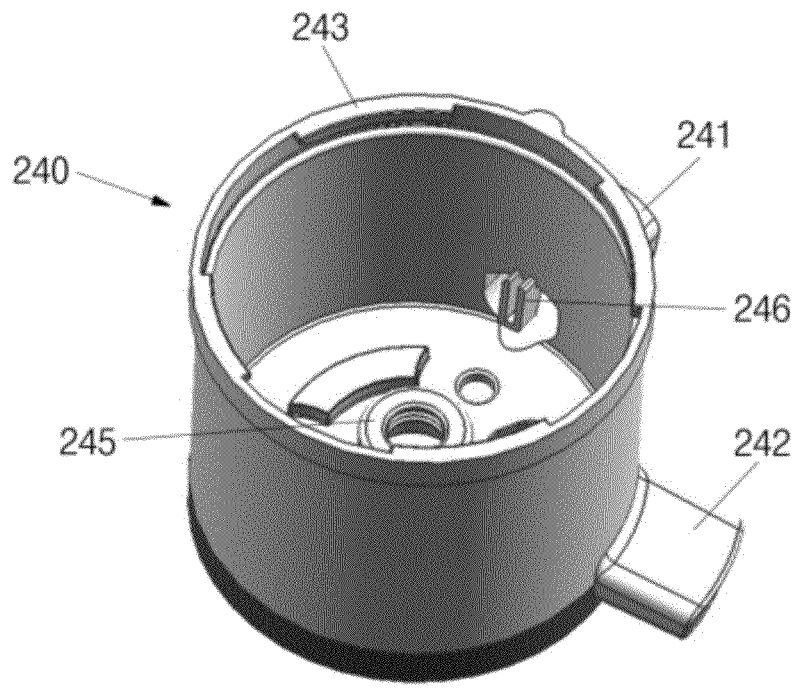
FIG. 13 illustrates an interior side of an extracting case shown in FIG. 10.

In particular, as shown in FIG. 13, an interior bottom portion of the extracting case 240 is flatly configured to accommodate the extracting screw unit 210, the rotary extracting net unit 220 and the discharge guide unit 230. In addition, a circular protrusion 245, to which the extracting screw unit 210 and a drive shaft 241 of a driving means are engaged, is formed at the center of the extracting case 240.

In addition, the extracting case 240 has the hooking portion 246 fixed at a front end of the juice outlet 241, the hooking portion 246 having a U-latter shape, corresponding to the stopper protrusion 266 formed on the outer peripheral surface of the cleaner 260. The hooking portion 246 may have various shapes as long as it matches with the stopper protrusion 266 of the cleaner 260.

A driving means (not shown) is installed within the driving-means housing 250, and the drive shaft 251 of the driving means is exposed to the outside of the driving-means housing 250 to then be engaged with the extracting screw unit 210 and the extracting case 240. Meanwhile, a control case 252 and a control panel 253 are disposed at one side of the driving-means housing 250 to control the driving means.

Hereinafter, the operation of the juice extracting apparatus according to the second embodiment of the present invention will be described with reference to the following drawings.

Figure 15:
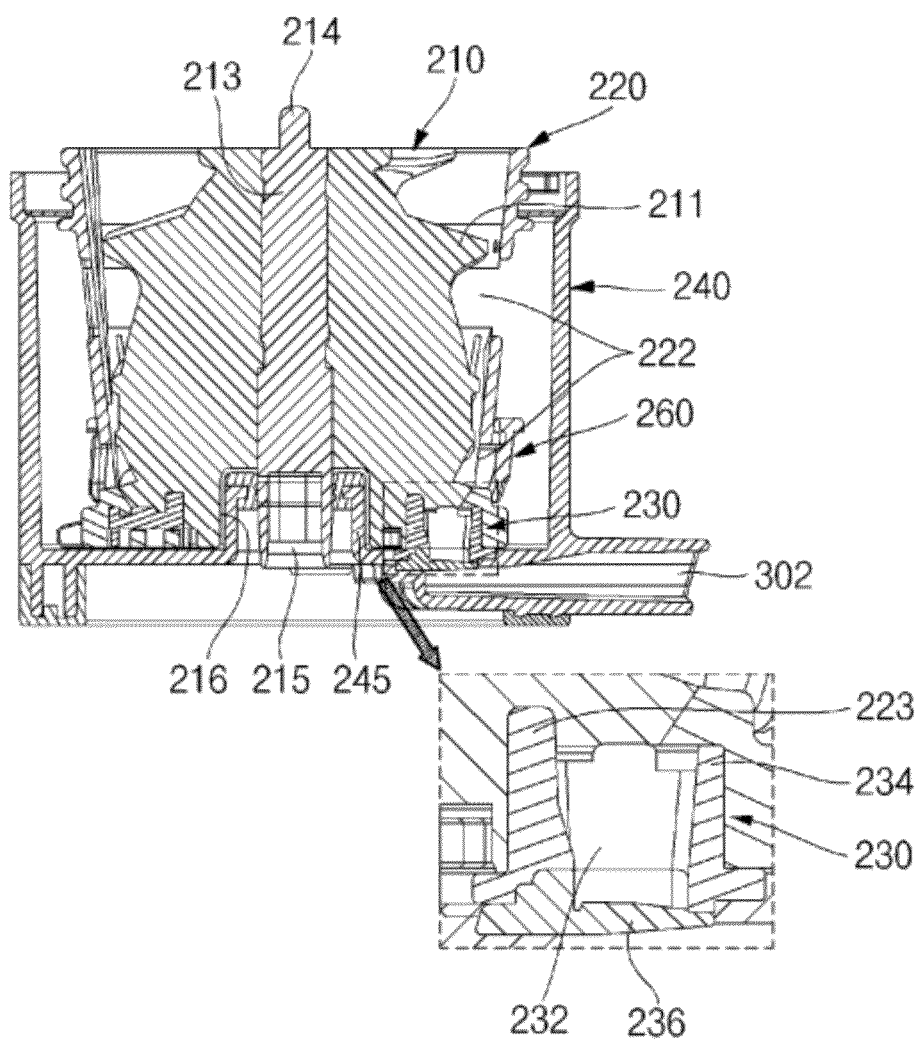
FIG. 15 is a cross-sectional view of the juice extracting apparatus shown in FIG. 10, in which a driving means shown in FIG. 10 is not illustrated.

As shown in FIG. 15, if a raw material is injected into the inlet 201, the extracting screw unit 210 engaged with the drive shaft 251 of the driving means, thereby slicing the raw material by the screw blade 211. In addition, the raw material is pulverized and conveyed by a guide protrusion 221 of the rotary extracting net unit 220 rotating in the opposite direction to a direction in which the extracting screw unit 210 rotates.

Like in the first embodiment of the present invention, the sun gear 212 of the extracting screw unit 210, the plurality of planet gears 231 of the discharge guide unit 230 and the ring gear 223 of the rotary extracting net unit 220 are engaged with each other. Accordingly, as the extracting screw unit 210 rotates, the rotary extracting net unit 220 rotates in the opposite direction to the direction in which the extracting screw unit 210 rotates.

Here, a distance between the outer peripheral surface of the extracting screw unit 210 and the inner peripheral surface of the rotary extracting net unit 220 gradually decreases toward a lower end of the extracting screw unit 210, and the conveyed raw material is compressed therebetween, thereby extracting juice from the raw material.

If the sludge of the downwardly conveyed raw material is subjected to greater than a predetermined pressure, the pressure of the sludge exceeds elasticity derived from one side 236-1 of the guide rubber 236 installed at a lower end of the discharge guide unit 230 to then be discharged to the outside through the sludge outlet 242 of the extracting case 240. The juice extracted from the raw material flows out through the mesh net 222 of the rotary extracting net unit 220 to then be discharged to the outside through the juice outlet 241 of the extracting case 240.

In the above-described procedure, when the rotary extracting net unit 220 rotates, a brush 224 wipes up the inner peripheral surface of the extracting case 240 while making a contact with makes a contact with the inner peripheral surface of the extracting case 240.

Figure 14:
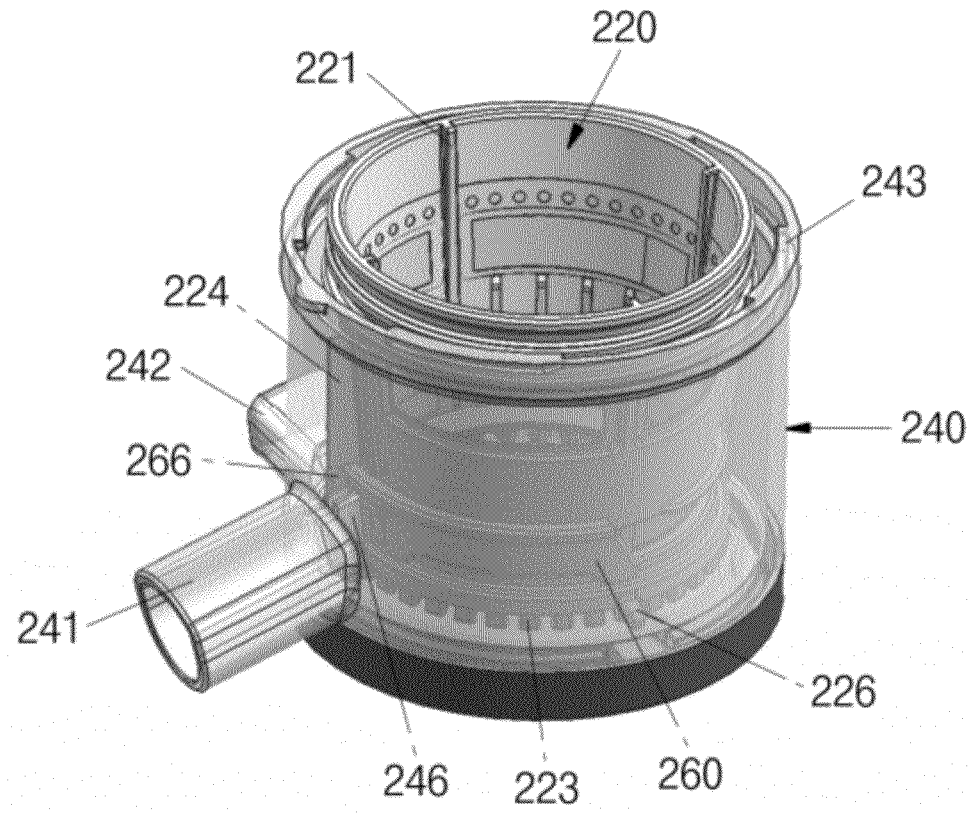
FIG. 14 illustrates a state in which the cleaner shown in FIG. 10 is installed inside the extracting case together with a rotary extracting net unit.

Meanwhile, while the cleaner 260 rotates together with the rotary extracting net unit 220, as shown in FIG. 14, if the stopper protrusion 266 of the cleaner 260 makes a contact with the hooking portion 246 of the extracting case 240, the cleaner 260 does not rotate. Accordingly, only the rotary extracting net unit 220 continuously rotates.

In this state, the cleaner rubber 262 fixed on the inner peripheral surface of the cleaner 260 is elastically bent to remove the sludge sticking on a surface of a bottom end of a mesh net 202 of the rotary extracting net unit 220.

Figure 16:
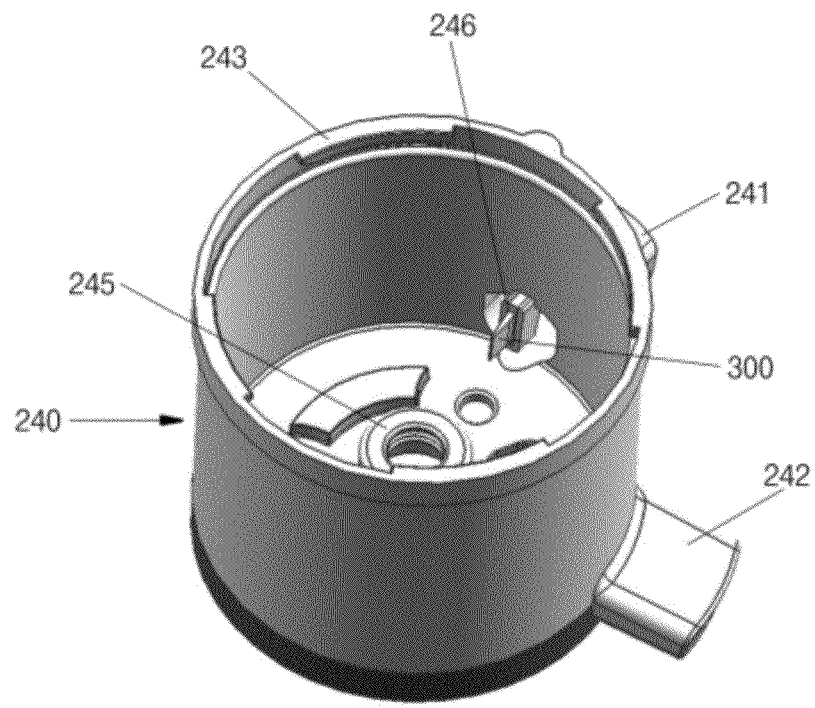
FIG. 16 illustrates an interior side of an extracting case of an according to a third embodiment of the present invention.
Figure 17:
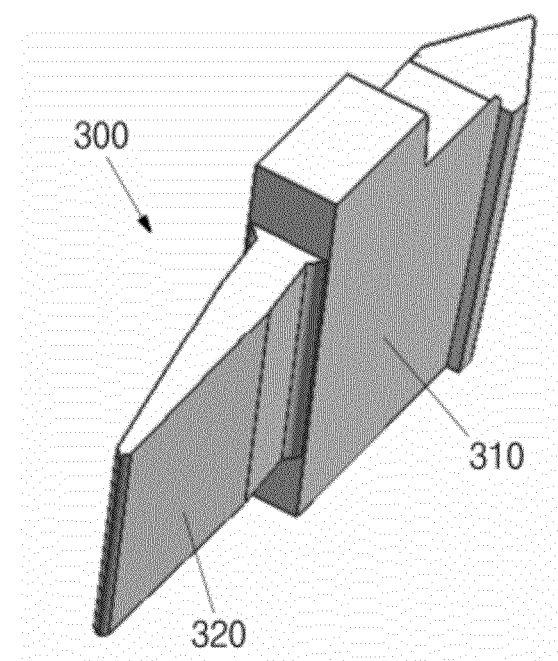
FIG. 17 is a perspective view of a cleaner shown in FIG. 16.
Figure 18:
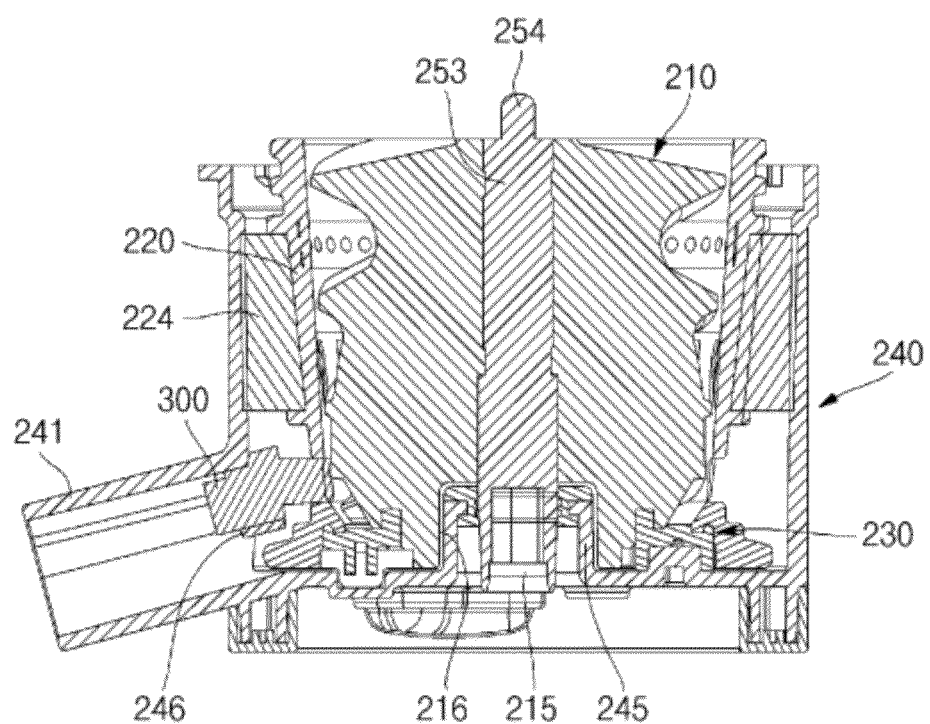
FIG. 18 is a cross-sectional view of a juice extracting apparatus with cleaners shown in FIGS. 16 and 17, in which a driving means shown in FIG. 16 is not illustrated.

FIG. 16 illustrates an interior side of an extracting case 240 of an according to a third embodiment of the present invention, FIG. 17 is a perspective view of a cleaner 300 shown in FIG. 16, and FIG. 18 is a cross-sectional view of a juice extracting apparatus with cleaner 300 shown in FIGS. 16 and 17. Here, a driving means is illustrated in the above drawings.

The general configuration of the juice extracting apparatus according to the third embodiment of the present invention is substantially the same as that of the juice extracting apparatus according to the second embodiment of the present invention. Therefore, the following description will focus on different structures in both embodiments. In addition, in the following embodiment, components having substantially the same function as the second embodiment are identified by the same reference numerals, and detailed descriptions thereof will be omitted.

The juice extracting apparatus according to the third embodiment of the present invention features in that the cleaner 260 as one component of the juice extracting apparatus according to the second embodiment of the present invention is replaced with a cleaner 300 having a simplified configuration, as shown in FIGS. 16 to 18.

That is to say, in this embodiment, the cleaner 300 is fixed on a hooking portion 246 of an extracting case 240 and is made of an elastic material. The cleaner 300 includes a fitting portion 310 formed stepwise so as to be fitted into the hooking portion 246 and an extending portion 320 integrally formed with the fitting portion 310 and extending toward the inside of the extracting case 240.

When a rotary extracting net unit 220 rotates, the extending portion 320 of the cleaner 300 fixed on the hooking portion 246 of the extracting case 240 is elastically bent while making a contact with the rotary extracting net unit 220. Accordingly, the extending portion 320 forcibly removes the sludge sticking on a mesh net 222 of the rotary extracting net unit 220.

As described above, in the juice extracting apparatuses according to the second and third embodiments of the present invention, since the extracting screw unit and the rotary extracting net unit rotate in a geared manner such that the extracting screw unit rotates in one direction and the rotary extracting net unit rotates in the opposite direction to the direction in which the extracting screw unit rotates, thereby improving juice extracting efficiency, compared to the conventional juice extracting apparatus in which only the screw is rotated.

In addition, since the extracting screw unit and the rotary extracting net unit rotate in opposite directions, the amount of sludge existing between the extracting screw unit and the rotary extracting net unit can be minimized and an outer surface of the rotary extracting net unit can be automatically cleaned by means of the brush and the cleaner.

As described above, although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

For example, in the juice extracting apparatus according to each of the embodiments of the present invention, a motor being capable of rotating forward and backward can be used as the driving means. When a large amount of raw material is injected into an injection cover for extracting juice therefrom, a large load may be applied to the motor, disabling the motor to properly rotate, thereby lowering juice extracting efficiency.

In addition, the juice extracting apparatus according to the present invention may further include a sensor sensing a current varying according to the load applied to the drive shaft, that is, the extracting screw unit (110 or 220) when excessive load is applied to the drive shaft of the driving means (motor), and a controller connecting the sensor and the driving means. The sensor and the controller are well-known components and are not illustrated in the drawings.

The controller controls the driving motor to stop according to a signal of the sensor indicating a change in the current due to the overload applied to the drive shaft of the motor, to then rotate backward. Therefore, the extracting screw unit (110 or 210), which is prevented from being rotated by the raw material, rotate in opposite directions, thereby eliminating the load applied to the drive shaft of the motor and caused by the raw material. Thereafter, the controller controls the motor to rotate forward, thereby performing a normal extracting process.

Although specific embodiments were described herein, it should be understood that many variations and modifications of the basic inventive concept herein described, which may appear to those skilled in the art, will still fall within the spirit and scope of the exemplary embodiments of the present invention as defined by the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A juice extracting apparatus comprising:
   an extracting case comprising a brush mounted on an inner surface thereof, a juice outlet and a sludge outlet communicating an internal space thereof with an outside;
   an extracting screw unit positioned in the internal space of the extracting case, the extracting screw unit comprising a screw shaft coupled to a drive shaft of a driving means at a lower end, a screw blade formed on an outer peripheral surface of the screw shaft, and a sun gear provided at the lower end of the screw shaft;
   a rotary extracting net unit in which the extracting screw unit is positioned, the rotary extracting net unit comprising a brush mounted on an outer peripheral surface of the rotary extracting net unit and making a contact with the inner surface of the extracting case, a mesh net facing the screw blade to filter sludge while allowing juice to pass therethrough, and a ring gear provided at a lower portion of the rotary extracting net unit; and a discharge guide unit positioned at the lower portion of the rotary extracting net unit, the discharge guide unit comprising planet gears engaged between the sun gear and the ring gear, and transmitting a rotational force of the extracting screw unit to the rotary extracting net unit, wherein the juice squeezed from a raw material injected while the extracting screw unit and the rotary extracting net unit rotate in opposite directions from each other is discharged through the juice outlet and the sludge is discharged to the outside through the sludge outlet.

2. The juice extracting apparatus of claim 1, wherein the screw blade has screw threads having a pitch interval gradually narrowing toward its bottom end from its top end.

3. The juice extracting apparatus of claim 1, wherein the rotary extracting net unit has at least one guide protrusion downwardly extending on its inner surface to convey the injected raw material downwardly in a geared manner with the screw threads of the screw blade.

4. The juice extracting apparatus of claim 1, wherein the rotary extracting net unit further comprises at least one rotary protrusion formed on the outer peripheral surface of its bottom end, the at least one rotary protrusion forcibly conveying the juice existing on the bottom of the rotary extracting net unit to the juice outlet.

5. The juice extracting apparatus of claim 1, wherein the extracting case further comprises a cylindrical protrusion formed at the center of the extracting case wherein the extracting screw unit and the driving means are engaged with the cylindrical protrusion.

6. The juice extracting apparatus of claim 1, wherein the rotary extracting net unit further comprises a cleaner mounted on its outer peripheral surface and capable of rotating together with the rotary extracting net unit, the cleaner comprising a rubber fixed on its inner surface and inwardly extending to correspond to the mesh net of the rotary extracting net unit.

7. The juice extracting apparatus of claim 6, wherein the cleaner has interior grooves radially formed on its inner peripheral surface and the rotary extracting net unit has exterior protrusions radially formed on its outer peripheral surface, so that the exterior protrusions of the rotary extracting net unit are accommodated in the interior grooves of the cleaner, thereby guiding rotation of the cleaner.

8. The juice extracting apparatus of claim 6, wherein the cleaner further includes a stopper protrusion fixed on its outer peripheral surface and the extracting case includes a hooking portion formed on a front end of the juice outlet, so that the cleaner does not rotate and only the rotary extracting net unit rotates when the stopper protrusion and the hooking portion make a contact with each other, and the rubber of the cleaner removes the sludge sticking on the mesh net of the rotary extracting net unit is removed.

9. The juice extracting apparatus of claim 6, wherein the extracting case further comprises a cylindrical protrusion formed at the center of the extracting case wherein the extracting screw unit and the driving means are engaged with the cylindrical protrusion.

10. The juice extracting apparatus of claim 7, wherein the cleaner further includes a stopper protrusion fixed on its outer peripheral surface and the extracting case includes a hooking portion formed on a front end of the juice outlet, so that the cleaner does not rotate and only the rotary extracting net unit rotates when the stopper protrusion and the hooking portion make a contact with each other, and the rubber of the cleaner removes the sludge sticking on the mesh net of the rotary extracting net unit is removed.

11. The juice extracting apparatus of claim 1, further comprising a cleaner fixed on the extracting case and made of an elastic material, wherein the cleaner make a contact with the rotating extracting net unit and forcibly removes the sludge sticking on the mesh net of the rotary extracting net unit.

12. The juice extracting apparatus of claim 11, wherein the extracting case further comprises a cylindrical protrusion formed at the center of the extracting case wherein the extracting screw unit and the driving means are engaged with the cylindrical protrusion.

13. The juice extracting apparatus of claim 11, the extracting case includes a hooking portion formed on a front end of the juice outlet.

14. The juice extracting apparatus of claim 13, wherein the cleaner includes a fitting portion fitted into the hooking portion and an extending portion extending from the fitting portion to the rotary extracting net unit and making a contact with the net unit of the rotating rotary extracting net unit.

15. The juice extracting apparatus of claim 1, wherein the extracting case further comprises a cylindrical protrusion formed at the center of the extracting case wherein the extracting screw unit and the driving means are engaged with the cylindrical protrusion.

16. The juice extracting apparatus of claim 1, wherein the discharge guide unit further comprises an outlet through which sludge of a compressed and juice-extracted raw material is discharged, and a guide rubber fixedly installed at a bottom end of the outlet and capable of elastically opening or closing the outlet at its one side.

17. The juice extracting apparatus of claim 1, further comprising an injection cover coupled to the extracting case, the injection cover comprising an inlet for injecting the raw material, an injection pipe integrally formed with the inlet so that the injected raw material is vertically conveyed, and a plurality of engagement protrusions radially formed at a bottom portion of the injection cover to be engaged with the extracting case.

18. The juice extracting apparatus of claim 1, further comprising:

a sensor sensing a current varying according to the load applied to the drive shaft of the driving means; and a controller connecting the sensor and the driving means, wherein when overload is applied to the drive shaft, the controller controls the driving means allowing the driving means to be rotated backward for a predetermined time and then to be rotated forward.

* * * * *